United States Patent
Koskela et al.

(10) Patent No.: US 6,744,742 B1
(45) Date of Patent: Jun. 1, 2004

(54) METHOD AND ARRANGEMENT FOR DEFINING TRANSMISSION POWER IN A MOBILE STATION

(75) Inventors: Marko Koskela, Oulu (FI); Ville Tiikasalo, Perniö (FI); Jari Järvisalo, Tampere (FI)

(73) Assignee: Nokia Mobile Phones Limited, Espoo (FI)

( * ) Notice: Subject to any disclaimer, the term of this patent is extended or adjusted under 35 U.S.C. 154(b) by 0 days.

(21) Appl. No.: 09/185,687

(22) Filed: Nov. 4, 1998

(30) Foreign Application Priority Data

Nov. 5, 1997 (FI) .................................................. 974144

(51) Int. Cl.[7] .............................................. H04B 7/185
(52) U.S. Cl. ...................... 370/318; 370/321; 370/329; 455/13.4; 455/522
(58) Field of Search ................................. 370/442, 310, 370/321, 326, 336, 345, 347, 337, 318, 314, 328, 329, 330, 332, 341, 344, 458, 459; 455/13.4, 522, 63

(56) References Cited

U.S. PATENT DOCUMENTS

| | | | |
|---|---|---|---|
| 5,349,630 A | | 9/1994 | Sointula .......................... 379/58 |
| 5,491,837 A | * | 2/1996 | Haartsen ........................ 455/62 |
| 5,564,074 A | | 10/1996 | Juntti ............................ 455/67.1 |
| 5,570,353 A | | 10/1996 | Keskitalo et al. .............. 370/18 |
| 5,579,306 A | * | 11/1996 | Dent ............................... 370/330 |
| 5,594,738 A | * | 1/1997 | Crisler et al. .................. 370/347 |
| 5,701,294 A | * | 12/1997 | Ward et al. .................... 370/252 |
| 5,809,017 A | * | 9/1998 | Smith et al. ................... 370/318 |
| 5,898,925 A | * | 4/1999 | Honkasalo et al. ........... 455/437 |
| 5,914,947 A | * | 6/1999 | Saito ............................. 370/337 |
| 6,047,189 A | * | 4/2000 | Yun et al. ...................... 455/452 |
| 6,067,446 A | * | 5/2000 | Persson et al. ................ 455/69 |
| 6,070,084 A | * | 5/2000 | Hamabe ........................ 455/522 |
| 6,072,792 A | * | 6/2000 | Mazur et al. .................. 370/345 |
| 6,084,868 A | * | 7/2000 | Piirainen ....................... 370/345 |
| 6,088,324 A | * | 7/2000 | Sato .............................. 370/203 |
| 6,463,295 B1 | * | 10/2002 | Yun .............................. 455/522 |
| 6,567,459 B1 | * | 5/2003 | Hakkinen et al. ............. 375/132 |

FOREIGN PATENT DOCUMENTS

| | | |
|---|---|---|
| EP | 0682418 A2 | 11/1995 |
| WO | WO 92/16059 | 9/1992 |
| WO | WO 95/31879 | 11/1995 |
| WO | WO 97/17769 | 5/1997 |
| WO | WO 97/34439 | 9/1997 |

\* cited by examiner

Primary Examiner—Phirin Sam
(74) Attorney, Agent, or Firm—Perman & Green, LLP

(57) ABSTRACT

The invention relates to a method (500) and an arrangement for defining transmission power in a mobile station. The invention can preferably be applied in a TDMA (Time Division Multiple Access) cellular system which offers broadband services and in which the number of time slots to be used for data transfer can be changed during the connection (530). One fundamental idea of the invention is that the transmission power of a new time slot is defined in the mobile station on the basis of the transmission power of at least one other time slot used in the connection (560). If the connection has had one time slot for its use when a new time slot is being allocated, for the transmission power of the new time slot, the same value is preferably set as at the previous time slot. If the connection has had two or more time slots for its use when a new time slot is being allocated, the value of the transmission power of the new time slot is preferably defined on the basis of the transmission powers of these other time slots according to a previously defined algorithm. As the algorithm, a minimum value, a maximum value or an average value can preferably be used.

10 Claims, 3 Drawing Sheets

METHOD AND ARRANGEMENT FOR DEFINING TRANSMISSION POWER IN A MOBILE STATION

The invention relates to a method and an arrangement for defining transmission power in a mobile station. The invention can preferably be applied in a TDMA (Time Division Multiple Access) cellular system which offers broadband services and in which the number of time slots used for data transfer can be changed during the connection.

In present-day mobile station networks, a so-called time division multiplexing, i.e. TDMA (Time Division Multiple Access) method is generally used. For example, in the GSM (Global System for Mobile communications) system, TDMA frames which consist of eight time slots are used on each frequency channel intended for communications use. Traditionally in mobile communication systems connection is established so that one time slot is allocated for the connection and the data transfer channel thus formed is often used during the entire connection. If the mobile station, however, is translocated from the service area of one base station to the service area of another base station, the change of an active base station, i.e. a so-called handover takes place, and then a channel using a new time slot is formed between the new active base station and the mobile station. One can transfer to a new channel also in such a case that one wishes to rearrange the channels used by the base station, for example, to minimize interference. The implementation of the new channel is not then connected to the change of the active base station.

Figure 1:
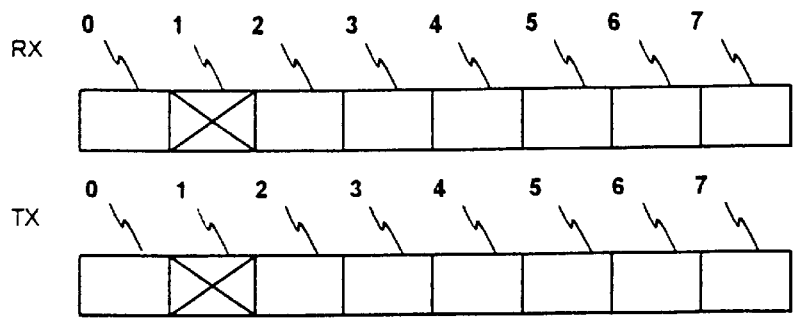

FIG. 1 shows a TDMA frame of the GSM system which comprises eight time slots 0–7. In the figure, a reception frame RX and a transmission frame TX have been shown separately. The reception frame means herein the frame received by a mobile station, i.e. a TDMA frame of downlink transfer direction. The transmission frame means herein the frame transmitted by a mobile station, i.e. a TDMA frame of uplink transfer direction. A time slot 1 has been marked with an X in FIG. 1 and it is used in data transfer of both uplink and downlink transfer direction in the connection described by the example.

Figure 2:
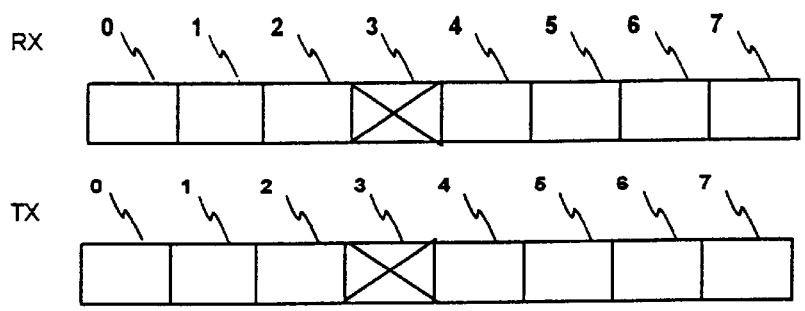

FIG. 2 shows the use of time slots in the connection according to FIG. 1 after a new time slot 3, which has been implemented instead of time slot 1, has been allocated for the connection. This new time slot can be in the same TDMA frame as the old time slot used by the connection, or it can also be a TDMA frame which is on a different frequency.

Especially for data transfer services, broadband HSCSD (High Speed Circuit Switched Data) services have been implemented in which the connection uses more than one time slot for speeding up data transfer. Then the numbers of time slots to be used can be equal in uplink and downlink transfer directions, in the case of a symmetric configuration, or they can be unequal, which is termed an asymmetric configuration. The time slots in use are defined at call establishment when the system informs the mobile station which time slots are to be used and the parameters connected to them, such as the transmission power to be used at each time slot.

The number of time slots in use can be changed also during the connection. The change occurs in accordance with the initiative from the system so that the system transmits to the mobile station a CONFIGURATION CHANGE COMMAND message which contains a proposal for a new time slot configuration. The mobile station responds to this with a CONFIGURATION ACKNOWLEDGE acknowledgement. The aforementioned message is just an alternative by means of which the number of time slots in an HSCSD connection can be changed. The said alternative is however preferable because it requires only a small amount of signalling.

Figure 3:
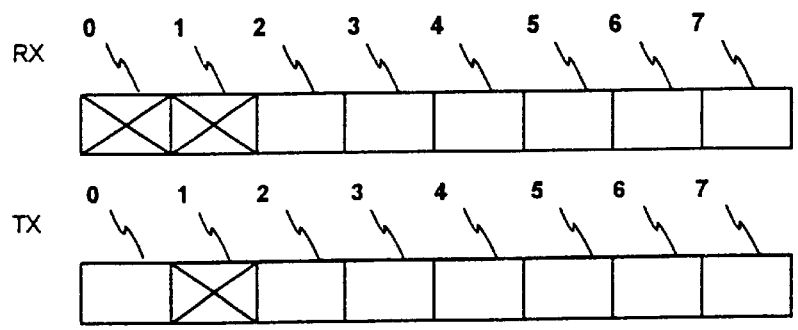
Figure 4:
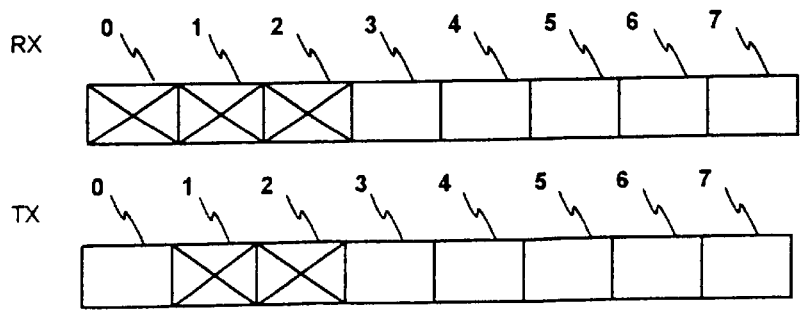

FIG. 3 shows a TDMA frame in a connection as an example in which two time slots 0 and 1 are used in a downlink transfer direction RX and one time slot 1 in an uplink transfer direction TX. FIG. 4 shows the use of time slots after the reconfiguration when one new time slot 2 has been implemented for the connection in both downlink and uplink transfer directions.

When a new time slot is allocated for the connection, the mobile communication system calculates the optimal transmission power for the new time slot for both the downlink and the uplink transfer direction. The value of transmission power calculated for the uplink transfer direction is transferred to the mobile station, for example, on a signalling channel. Said CONFIGURATION CHANGE COMMAND message does not contain information, for example, about the value of the transmission power to be used on the new time slot.

Fundamental disadvantages are, however, associated with the solutions according to prior art. In known mobile phone systems, e.g. in the GSM system, power setting parameters are transmitted at communications SACCH (Slow Associated Control CHannel) time slots at intervals of 0.5 seconds. If, at the implementation of a new time slot, the transmission power is set, for example, at its maximum value, it stays at this value perhaps for as long as 0.5 seconds before the power setting parameter is received from the base station.

When the power setting parameter has been received, the mobile station changes the value of the transmission power according to the parameter concerned step by step. In the GSM system, there are 15 steps between the minimum and maximum transmission powers and it takes 60 ms to perform one power changing step. Accordingly, it takes altogether 0.9 s to change power from its maximum value to the minimum value. When the delay elapsed for the reception of the parameter, the aforementioned 0.5 s at its maximum, is added to this time, it takes altogether 1.4 s at maximum to attain the correct transmission power, and during all of this time the transmission power is too high in the example described above.

This strong transmission power which lasts for quite a long time may cause co-channel interferences to other radio links. The use of high transmission power levels reduces significantly data transfer capacity, since in this case those base stations which are using the same frequency channel must be situated at great distances from each other. Furthermore, unnecessarily high transmission power levels increase current consumption of a mobile station. In particular high transient power levels put major stresses on the power supply circuits and the RF power amplifier.

Excessive transmission power could be avoided by setting the transmission power of a new time slot at its minimum value from which power it could be elevated when necessary after the transmission power parameter has been received. A problem with this procedure is, however, that when transmission power is too low, then data transfer may fail.

One solution would be to transmit power setting parameters considerably more frequently. A disadvantage of this solution is, however, that continuous transfer of control messages on communications channels would burden significantly the data transfer capacity of the mobile communication system. Another solution would be to include the power adjustment parameter in the message which is used for informing about the implementation of a new time slot. A problem with this solution is, however, that it is difficult to arrange the space required by the parameter into the message concerned and secondly, at this stage the base station has not necessarily managed to define the correct transmission power parameter for the mobile station.

The aim of the present invention is to avoid the above described disadvantages connected to prior art by devising a solution in which the transmission power of a new time slot can immediately be made close to the optimal value without increasing signalling between the base station and the mobile station.

One fundamental idea of the invention is that the transmission power of a new time slot is defined in the mobile station on the basis of transmission power of at least one other time slot used in the connection. If there has been one time slot for the use of the connection when a new time slot is being allocated, preferably the same value is set for the transmission power of the new time slot as it had at the time slot previously in use. If there have been two or more time slots for the use of the connection when a new time slot is being allocated, the value of the transmission power of the new time slot is preferably defined on the basis of the transmission powers of these other time slots according to a previously defined algorithm. As the algorithm, a minimum value, a maximum value or an average value can preferably be used.

It is possible to use the solution according to the invention when one or more new time slots are needed for a connection in addition to the time slots which are already in the connection use. Furthermore, the method according to the invention can be applied when it is desired to transfer the connection from the old time slot (old time slots) to a new time slot (new time slots) by performing the change of channel without changing the frequency. The invention can be applied in the changes of multichannel configurations independent of signalling messages used, if the frequency used, i.e. the physical channel does not change.

The invention is partially based on the observation that on the channels between the mobile station and the base station, the values of the optimal transmission powers are very close to each other. Thus a fundamental advantage of the invention is that the transmission power of the new time slot in the mobile station can be made very close to the optimal value immediately at the implementation of a new time slot. Thus problems of interference caused by excessive transmission power can be avoided, as well as increase in power consumption and transient peaks in power consumption. Similarly, the risk that the transmission power of the new time slot would be too low to permit a successful data transfer is minimized.

Furthermore, an advantage of the invention is that, at the implementation of a new time slot, no extra data transfer is needed, and in that way the use of the method according to the invention does not burden the data transfer capacity of the connection.

A method according to the invention for defining the transmission power of a mobile station during the connection between a mobile station and a mobile communication system, when data transfer in an uplink transfer direction occurs at least at one time slot of a TDMA frame and during the connection a new time slot is allocated for the uplink transfer direction of the connection, is characterized in that the transmission power of said new time slot is defined on the basis of the transmission power of some other time slot being used in the uplink transfer direction of said connection.

A mobile station linked to a mobile communication system according to the invention, such that the mobile station comprises means for transferring data at least at one time slot of a TDMA frame and means for allocating a new time slot during the connection, is characterized in that the mobile station comprises means for defining the transmission power of said new time slot on the basis of the transmission power of some other time slot in use in the data transfer of said connection.

Preferable embodiments of the invention have been presented in dependent claims.

Figure 5:
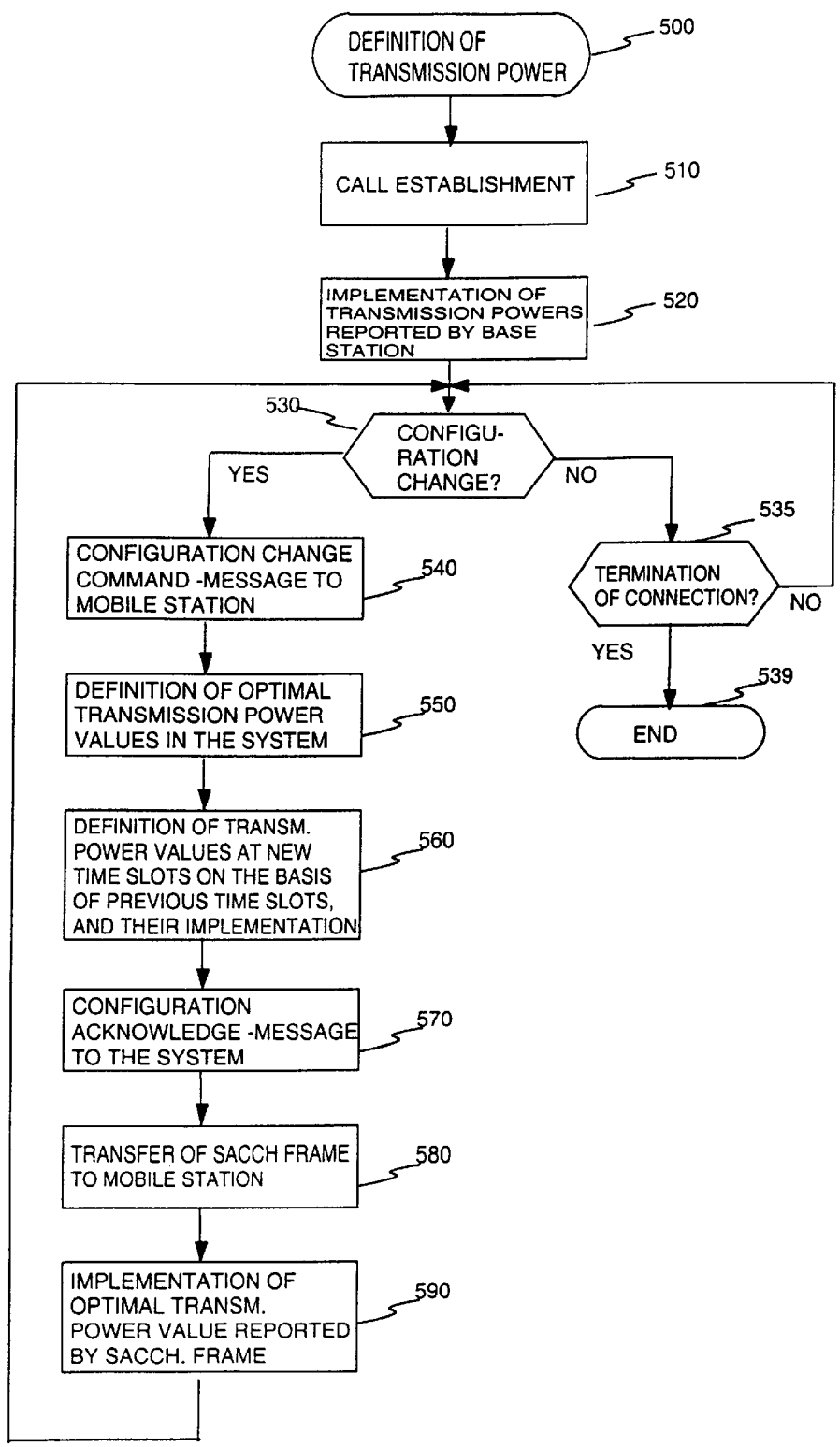
Figure 6:
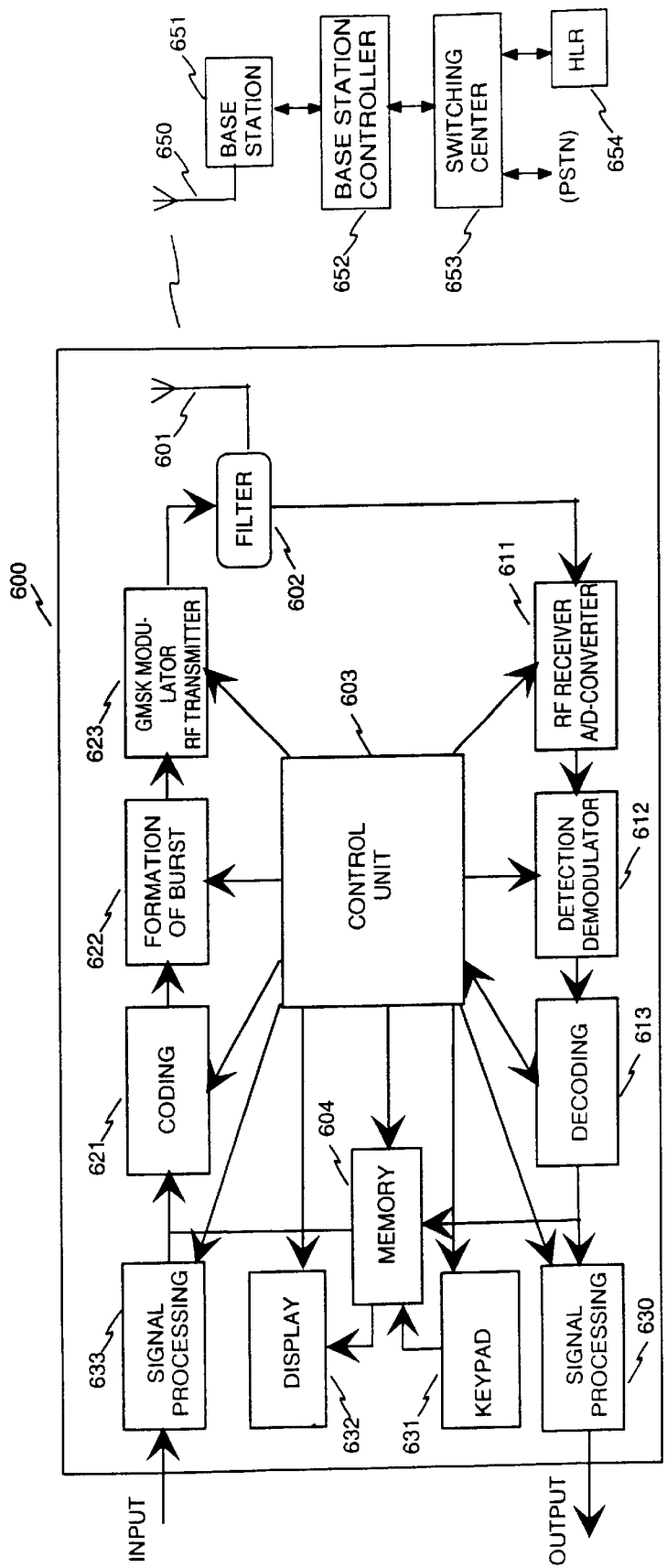

In the following, embodiments of the invention are described more closely by means of the attached drawings of which FIG. 1 shows an allocation of a time slot of a TDMA frame in a conventional connection in which one time slot is used, FIG. 2 shows an allocation of a time slot of a TDMA frame after a reconfiguration of the connection according to FIG. 1, FIG. 3 shows an allocation of time slots of a TDMA frame in an HSCSD connection, FIG. 4 shows an allocation of time slots of a TDMA frame after a reconfiguration of the connection according to FIG. 3, FIG. 5 shows a method according to the invention for defining transmission power and FIG. 6 shows a block diagram of a mobile station according to the invention.

FIGS. 1–4 have been described above in the context of the description of prior art.

FIG. 5 shows a method according to the invention for defining the transmission power of a new time slot in a mobile station when HSCSD connection is used. In it, connection is established 510, at which, according to prior art, a message is transferred from the mobile communication system to the mobile station reporting time slots to be used at the initiation of the connection and transmission power to be used at each time slot of an uplink transfer direction, which transmission power is further implemented on the connection, 520. Thereafter, it is monitored whether there is a need to change the connection configuration, 530. When a change in the connection configuration becomes necessary, the mobile communication system transmits to the mobile station a CONFIGURATION CHANGE COMMAND message informing the mobile station of the new configuration, 540. In addition, the mobile communication system defines the optimal transmission powers for the new time slots, 550.

Thereafter, the mobile station defines the transmission power at each new time slot in an uplink transfer direction. This occurs according to the invention on the basis of the transmission powers at time slots of an uplink transfer direction which were used prior to the reconfiguration, 560. The new time slot is implemented by using the transmission power defined in this manner. If the mobile station is able to control the new, proposed configuration, it responds to the system with a CONFIGURATION ACKNOWLEDGE message, 570.

Thereafter, the mobile station waits for the next SACCH signalling frame of the downlink transfer direction and, after having received it, phase 580, the mobile station reads from the L1 field of the SACCH frame the optimal transmission power value which has been defined for each new time slot. If this optimal value of the transmission power is not equal to the value calculated from the transmission powers of previous time slots, the transmission power is changed to be in accordance with the optimal value, 590. Finally, it remains vigilant to be ready to respond to a possible subsequent reconfiguration, 530, or the termination of the connection, 535, 539.

If one or more of the old time slots remain for the use of the connection after the reconfiguration, in that time slot, the same transmission power can preferably be used as before the reconfiguration.

If, prior to the implementation of a new time slot, only one time slot of the uplink transfer direction has been used on the connection, the transmission power at the new time slot is preferably the same as the transmission power of the old time slot used on that connection.

If, prior to the implementation of a new time slot, two or more time slots have been used on the connection, some mathematical function can be used in the definition of the transmission power of the new time slot, such as minimum/maximum values, averaging, or some other statistical method for calculating the expectation value.

If, at a new time slot, the maximum value of the transmission powers of the previous time slots is used, one achieves maximal certainty that the quality of data transfer at that time slot is adequate. Then, however, interferences caused to the other users of the same channel can be comparatively great.

If, at a new time slot, the minimum value of the transmission powers of the previous time slots is used, a minimal interference level is obtained for the other users of the same channel, but the probability for a poor quality of connection increases. When the minimum value is used, also the power consumption of the mobile station is minimal.

When the average of the previous time slots is used, a compromise solution is obtained from the properties of the aforementioned two alternatives.

One method for defining the transmission power for a new time slot is to use the transmission power value of the main channel of the previous configuration. By a main channel one means on an HSCSD connection of the GSM system that (bidirectional) channel on which the main signalling of a multislot configuration is transferred, i.e. FACCH and SACCH signalling.

In addition to the transmission powers which were previously valid, in the definition one can also use the transmission power history of those which have been used in the connection, i.e. transmission power values which have been used earlier than just before the implementation of the new time slot. Thus one can take into consideration, for example, the possible translocation of the mobile station.

It should also be noted that when many new time slots are implemented, for each new time slot the transmission power value can be defined in a manner such that the transmission power values of the new time slots differ from each other.

FIG. 6 shows a simplified block diagram of a mobile station 600 according to the invention and its connection to the cellular system. The mobile station comprises an antenna 601 for receiving a radio frequency signal, i.e. an RF signal transmitted by a base station. The received RF signal is directed, for example, by a duplex filter 602 to an RF receiver 611 in which the signal is amplified and converted into a digital form. Thereafter the signal is detected and demodulated, block 612, and decoding is performed in block 613. Thereafter, signal processing is performed depending on whether the information to be transferred is speech or data. Data can be stored as such into the memory of the mobile station or alternatively, the processed data is transferred after signal processing to a possible external device, such as a computer. The possible processed speech signal is directed to an earpiece (not shown in the figure). A control unit performs the control of the aforementioned reception blocks according to a program which has been stored in the unit. The control unit controls decoding 613 and memory 604 in such a way that the transmission power data received from the system are detected from the SACCH frames and stored into the memory.

The transmission operation from a mobile station according to the invention occurs, for example, in the following way. A control unit 603 performs first coding according to the system to a signal (data/speech) to be transferred in block 621. From the coded data, bursts are formed, block 622, which are modulated and amplified into an RF signal to be transmitted in block 623. The RF signal to be transmitted is transferred to an antenna 601, for example, through a duplex filter 602. Also the aforementioned processing and transmission operations are controlled by the control unit 603. Especially the control unit controls the RF transmission 623 in such a way that at each time slot, the transmission power has been defined according to the invention. For this purpose, the control unit reads from the memory 604 the transmission powers of the time slots which have been used previously and defines the transmission power of the new time slot on the basis of them and an algorithm stored in the memory 604. Furthermore, the control unit monitors the reception of the SACCH frame and changes the transmission power of the new time slot to correspond to the optimal value received from the system as soon as the SACCH frame has been received.

FIG. 6 shows additionally a keypad 631 and a display 632 which are included in a conventional mobile station. The blocks of a mobile station according to the invention can be formed by means of components known per se. A control unit which controls other blocks, however, performs the control operations of the blocks according to specialized software, and this is how the above described operations of blocks according to the invention are implemented.

FIG. 6 shows additionally the parts of a cellular system which are used in call establishment and data transfer and which were already dealt with in more detail above. The transmission and reception of an RF signal occurs via an antenna 650 of a base station 651. From the base station 651, data transfer connection is further established through a base station controller 652 to a switching center 653. The switching center 653 is linked, in addition to the other base station systems of the system, also, among others, to a home location register 654 and a public switched telephone network PSTN.

The invention has been described above by means of some presented embodiments. It is, however, clear that the invention is not solely restricted to them but it is freely modifiable within the limits determined by the attached claims.

It should be noted particularly that the invention is not restricted to the GSM system but it can readily be applied also in other systems exploiting the TDMA method.

Similarly, it should be noted that the CONFIGURATION CHANGE COMMAND message stated in the above described embodiments is just one example for changing the multislot configuration of an HSCSD connection, and the invention can naturally be applied also in the context of other configuration changing methods.

Compared to those presented, more complicated configurations may appear in various operating situations within the framework of the inventive principle. Algorithms defining the default value of the transmission power can be more complex and take also other factors into consideration in addition to the transmission powers of the time slots used during the connection.

What is claimed is:

1. A method for defining transmission power of a mobile station during a connection between a mobile station and a mobile communication system, when data transfer in an uplink transfer direction occurs at least at one time slot of a TDMA frame and, during the connection, a new time slot is allocated for the uplink transfer direction of the connection, characterized in that transmission power of said new time slot is defined on the basis of transmission power of said at least one time slot used in the uplink transfer direction of said connection.

2. A method according to claim 1, characterized in that the new time slot is used in data transfer in addition to said at least one time slot.

3. A method according to claim 1, characterized in that the new time slot is used in data transfer instead of said at least one time slot.

4. A method according to claim 1, characterized in that the transmission power of the new time slot is defined on the basis of the transmission power of at least two time slots used in the data transfer of said connection.

5. A method according to claim 4, characterized in that said transmission power of the new time slot is substantially any one of the following:
   a minimum value of the transmission powers of said at least two time slots,
   a maximum value of the transmission powers of said at least two time slots,
   an average of the transmission powers of said at least two time slots.

6. A method according to claim 1, characterized in that the transmission power of the new time slot is essentially the transmission power value of a main channel.

7. A method according to claim 1, in which data is transferred between the mobile station and the mobile communication system linked to it, characterized in that
   a first value of said transmission power of the new time slot is defined in the mobile station on the basis of the transmission power of said at least one time slot used in the data transfer of said connection,
   a second value for the transmission power is defined in the mobile communication system,
   data concerning said second value is transferred from the mobile communication system to the mobile station and
   said value of the transmission power of the new time slot is changed into said second value.

8. A mobile station linked to a mobile communication system, which comprises means for transferring data at least at one time slot of a TDMA frame and means for allocating a new time slot during a connection, to the uplink direction of the connection characterized in that it comprises means for defining transmission power of said new time slot on the basis of transmission power of said at least one time slot used in the uplink data transfer of said connection.

9. A mobile station according to claim 8, characterized in that it comprises means for defining said transmission power of the new time slot on the basis of transmission power of at least two other time slots used in the data transfer of said connection.

10. A mobile station according to claim 8, characterized in that it comprises means for receiving transmission power data from the base station and for changing said transmission power of the new time slot to be in accordance with the received transmission power data.

* * * * *